US009584055B2

(12) United States Patent
Cooper et al.

(10) Patent No.: US 9,584,055 B2
(45) Date of Patent: Feb. 28, 2017

(54) VOLTAGE REGULATOR SYSTEM FOR A GENSET

(75) Inventors: Alan Cooper, Carrickfergus (GB);
Keith Chambers, Magherafelt (GB);
David McGowan, Lisburn (GB); John Morrow, Ballymena (GB)

(73) Assignee: Caterpillar (NI) Limited, Larne, Northern Ireland ( * ) Notice: Subject to any disclaimer, the term of this patent is extended or adjusted under 35 U.S.C. 154(b) by 84 days.

(21) Appl. No.: 14/414,709

(22) PCT Filed: Jul. 17, 2012

(86) PCT No.: PCT/EP2012/064033
§ 371 (c)(1),
(2), (4) Date: Apr. 21, 2015

(87) PCT Pub. No.: WO2014/012581
PCT Pub. Date: Jan. 23, 2014

(65) Prior Publication Data
US 2015/0236630 A1    Aug. 20, 2015

(51) Int. Cl.
*H02P 9/00*    (2006.01)
*H02P 9/44*    (2006.01)
*H02P 9/30*    (2006.01)

(52) U.S. Cl.
CPC ............... *H02P 9/44* (2013.01); *H02P 9/008* (2013.01); *H02P 9/30* (2013.01)

(58) Field of Classification Search
CPC ............... H02P 9/44; H02P 9/30; H02P 9/008
USPC ........ 322/20, 33, 34, 14; 290/40 A, 40 R, 52
See application file for complete search history.

(56) References Cited

U.S. PATENT DOCUMENTS

| | | | |
|---|---|---|---|
| 3,771,821 A | | 11/1973 | Rist et al. |
| 4,219,769 A | * | 8/1980 | Macfarlane ............ H02P 9/305 322/28 |
| 4,727,307 A | | 2/1988 | Kaneyuki et al. |
| 4,990,846 A | | 2/1991 | Buck et al. |
| 5,006,781 A | | 4/1991 | Schultz et al. |
| 5,294,879 A | | 3/1994 | Freeman et al. |
| 5,550,457 A | * | 8/1996 | Kusase ................ H02J 7/1492 322/28 |
| 5,852,927 A | * | 12/1998 | Cohn .................... F01D 15/02 290/52 |
| 5,925,939 A | | 7/1999 | Iwatani et al. |

(Continued)

FOREIGN PATENT DOCUMENTS

| | | |
|---|---|---|
| CN | 101878575 | 11/2010 |
| WO | WO 2008/000071 | 1/2008 |
| WO | WO 2014/012581 | 1/2014 |

OTHER PUBLICATIONS

International Search Report dated Aug. 9, 2013.

(Continued)

*Primary Examiner* — Julio C. Gonzalez Ramirez

(57) ABSTRACT

A voltage regulator system for regulating an output voltage of a genset includes a voltage regulator for reducing terminal voltage in response to a reduction in terminal frequency. A plurality of under-frequency roll-off (UFRO) states is provided in the voltage regulator, with each UFRO state being configured to implement a UFRO characteristic. An operational signal indicative of an operating condition of the genset forms the basis for selection of the UFRO characteristic.

9 Claims, 7 Drawing Sheets

(56) References Cited

U.S. PATENT DOCUMENTS

| | | |
|---|---|---|
| 8,166,942 B2 | 5/2012 | Uplap et al. |
| 2004/0010349 A1 | 1/2004 | Perez et al. |
| 2009/0140576 A1* | 6/2009 | Yu .............................. H02J 3/28 307/66 |
| 2010/0156117 A1* | 6/2010 | Allen ........................ H02J 9/08 290/40 C |
| 2011/0248511 A1* | 10/2011 | Marlenee .................. H02P 9/04 290/1 A |

OTHER PUBLICATIONS

Chambers, KDR, et al; "A Digital Load Relief Scheme for a Diesel Generating Set", Power Engineering Society General Meeting, 2007, IEEE, PI, Jun. 1, 2007, pp. 1-7.

* cited by examiner

VOLTAGE REGULATOR SYSTEM FOR A GENSET

CLAIM FOR PRIORITY

This application is a U.S. National Phase entry under 35 U.S.C. §371 from PCT International Application No. PCT/EP2012/064033, filed Jul. 17, 2012, which is incorporated herein by reference.

TECHNICAL FIELD

The present disclosure relates generally to engine-generator power systems, and more particularly, to an engine-generator power system having a voltage regulator system.

BACKGROUND

An engine-generator or a genset may be a combination of an engine and a generator. Both components may be mounted together to form a single machine. A genset may provide electricity at various locations such as construction sites or emergency response sites. A genset may be a small person-portable device or a larger device that may be mounted on a skid or a trailer, depending on the requirements and location, and the amount of power that is needed for a particular use.

Gensets may be used as a backup power source or a primary power source. If power from a primary power source is no longer available the genset may be used for backup power. The genset may be shutdown when the primary source is made available again. The genset may also be used as a primary power source. In this case, the genset may be operated for extended periods of time during operation periods and subsequently shut down outside operation periods. In either case, the genset may remain in a shutdown condition for extended periods of time between operations. Cold gensets may be less efficient than gensets that are warm or hot. Thus, a genset that has not been in operation for an extended period may have a poor load acceptance.

An engine's efficiency may depend on the temperatures of its components and ambient atmospheric conditions. Loss of thermal energy produced from combustion through the cylinder walls will heat the engine block and cylinder head, its coolant, oil and other components and may finally be lost into the environment. In addition, at lower temperatures the lubricating oil's higher viscosity may lead to increased pumping and frictional losses within the engine. These increased losses, in combination with lower combustion efficiency, lead to reduced cold engine performance.

Engine manufacturers may often change the operation of the fuel delivery, or air systems, to mitigate the effects of a cold engine. One example of this is variance of the engine's injection timing in order to improve cold performance. With the introduction of engines with electronic control, the maximum fuel quantity delivered per stroke is also commonly limited until the engine has warmed. These techniques may reduce the engine's output power further thereby reducing the genset load acceptance capability when cold.

In many standby applications a jacket water heater may be fitted to the engine to continuously heat the coolant, maintaining it close to its full operating temperature. The jacket water heater may mitigate some of the difficulties which occur if the engine is started from cold. The practice may increase the operating cost to the site operator.

US2010156117 discloses a genset power system having a monitoring device configured to monitor the genset and to generate a signal. A performance module may be configured to provide an alarm and a shutdown command to the engine based on the signal. The power system may further have a switching device for switching between a first condition and a second condition. When the first condition of the switching device is active, the performance module may be overridden, the engine may be operated at a reduced speed and load output, and the generator may be inhibited from producing electrical power. When the second condition of the switching device is active, the performance module may affect operation of the power system, the engine may be operated at an elevated speed and load output, and the generator may be allowed to produce electrical power directed to the external load.

The present disclosure is directed, at least in part, to improving or overcoming one or more aspects of the prior art system.

BRIEF SUMMARY OF THE INVENTION

In a first aspect, the present disclosure describes a voltage regulator system for regulating an output voltage of a genset, the voltage regulator system comprising: a voltage regulator comprising a plurality of UFRO states which are selected based on an operational signal indicative of the operating condition of the genset and a controller, which may be a PID controller. Each UFRO state is configured to implement a UFRO characteristic for reducing terminal voltage in response to a reduction in terminal frequency In a second aspect, the present disclosure describes a method for regulating an output voltage of a genset comprising a voltage regulator system, the method comprising the steps of: monitoring an operational condition of genset; sending an operational signal indicative of the operational condition to a controller, which may be a PID controller, configured to receive the operational signal; selecting a UFRO characteristic from a plurality of UFRO states based on the operational signal; and implementing the UFRO characteristic for reducing terminal voltage in response to a reduction in terminal frequency.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figure 1:
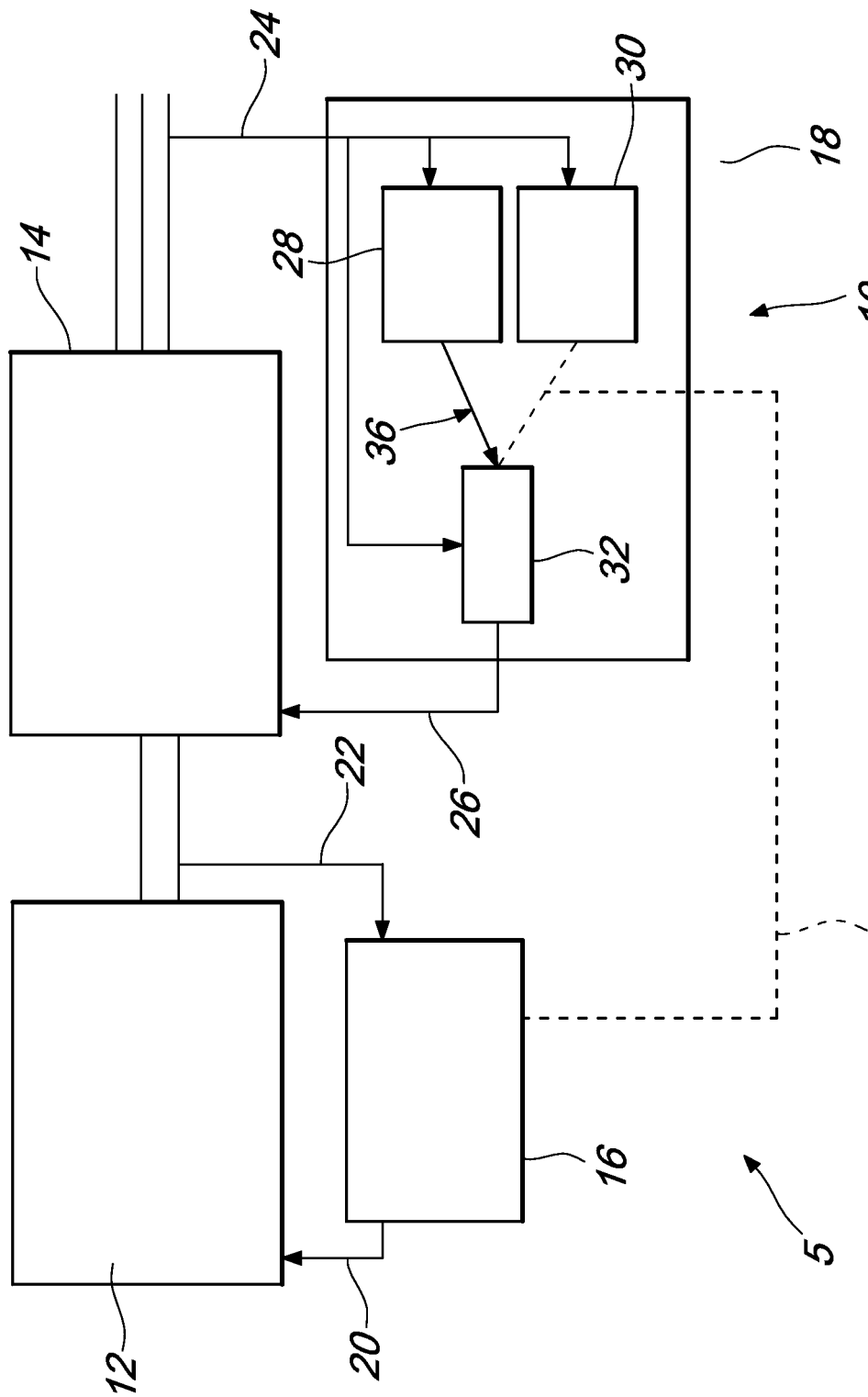
FIG. 1 is a schematic representation of a genset having a voltage regulator system according to the present disclosure.

This disclosure generally relates to a voltage regulator system 10 for a genset 5. The voltage regulator system 10 may regulate the electrical output of the genset 5.

The genset 5 may comprise an engine 12 and a generator 14. The genset 5 may be provided with control systems: an electronic control unit 16 and a voltage regulator 18.

The electronic control unit 16 may be able to regulate fuel delivery 20 to the engine 12. The electronic control unit 16 may monitor engine speed 22. Electronic control unit 16 may deliver fuel across the entire load range to obtain constant speed operation for a constant supply frequency from the genset. Additional load may require increased fuelling as detected by transient decreases in engine speed. Electronic control unit 16 may comprise a microprocessor for control of fuel delivery. The electronic control unit 16 may be an engine governor.

The electronic control unit 16 may monitor engine operating conditions and/or ambient conditions. The electronic control unit 16 may monitor engine temperatures and pressures and/or ambient temperatures and pressures.

Generator 14 may be an alternator. Generator 14 may have a synchronous machine to provide brushless excitation. The output of the synchronous machine may be passed through a rotating rectifier before supplying the main machine field winding.

Voltage regulator 18 may measure the alternator's terminal voltage and frequency 24. Voltage regulator 18 may calculate the error between actual and nominal terminal voltage and frequency 24. Voltage regulator 18 may vary magnetic field in the generator 14. Voltage regulator 18 may vary the level of excitation 26.

Voltage regulator 18 may be configured to regulate operation of generator 14 based on input from monitoring devices and/or from electronic control unit 16. Voltage regulator 18 may affect operation of generator 14 to increase or decrease an electrical output produced by generator 14. Voltage regulator 18 may affect operation of engine 12 to increase or decrease an electrical output produced by generator 14.

In an embodiment, genset 5 may have a supervisory controller which may serve as a human-machine interface. Supervisory controller may allow a user to configure the nominal voltage and frequency settings, to monitor various temperatures and pressures and to monitor the real and reactive power outputs. The supervisory controller may also monitor the outputs of the engine 12 and generator 14 to ensure operation of the genset 5.

The voltage regulator system 10 may be disposed in the voltage regulator 18.

The voltage regulator system 10 may reduce the desired terminal voltage when the frequency drops below a threshold. The desired terminal voltage may be reduced so as to improve transient performance and prevent the engine 12 from stalling. Voltage regulator system 10 may employ an under-frequency roll-off (UFRO) to reduce the expected terminal voltage when the frequency drops.

When a large load is applied to the genset 5 the resultant deceleration of the engine 12 may be detected by the voltage regulator system 10 as a reduction of frequency. Voltage regulator system 10 may reduce the voltage as a consequence of the reduction of frequency.

The voltage regulator system 10 may allow the terminal voltage to reduce so as to lower the real power component of the load if the terminal frequency decreases below a threshold. The threshold may be predetermined. Upon recovery of engine 12 and with an increase of the terminal frequency, the voltage regulator system 10 may return the terminal voltage to its nominal value.

The voltage regulator system 10 may implement a UFRO characteristic to reduce the desired terminal voltage when the frequency drops. Voltage regulator system 10 may implement a UFRO characteristic to provide consistent transient performance and prevent the engine 12 from stalling.

Voltage regulator system 10 may select and implement a UFRO characteristic from a plurality of UFRO characteristics.

A UFRO characteristic may be provided in the voltage regulator 18 through a UFRO state. Voltage regulator 18 may have a UFRO state 28 for a specific UFRO characteristic. The voltage regulator 18 may have UFRO states 28, 30 each for a specific UFRO characteristic. The UFRO states 28, 30 may each receive terminal voltage and frequency 24 input signals.

Voltage regulator 18 may have a processor to select a UFRO state 28, 30 for implementing a specific UFRO characteristic. Voltage regulator 18 may have a processing logic for selection of a UFRO state 28, 30. UFRO selection 36 may be performed by a processing logic.

In an embodiment, the UFRO states 28, 30 may be provided in separate modules.

In an embodiment, the voltage regulator 18 may be provided with a plurality of UFRO states for selection of a UFRO. The plurality of UFRO states may be provided in a corresponding plurality of modules.

A first UFRO characteristic may be 1:1 V/Hz and a second UFRO characteristic may be 3:1V/Hz. In an embodiment, UFRO state 28 may provide the first UFRO characteristic of 1:1 V/Hz. In an embodiment, UFRO state 30 may provide the second UFRO characteristic of 3:1 V/Hz.

Figure 2:
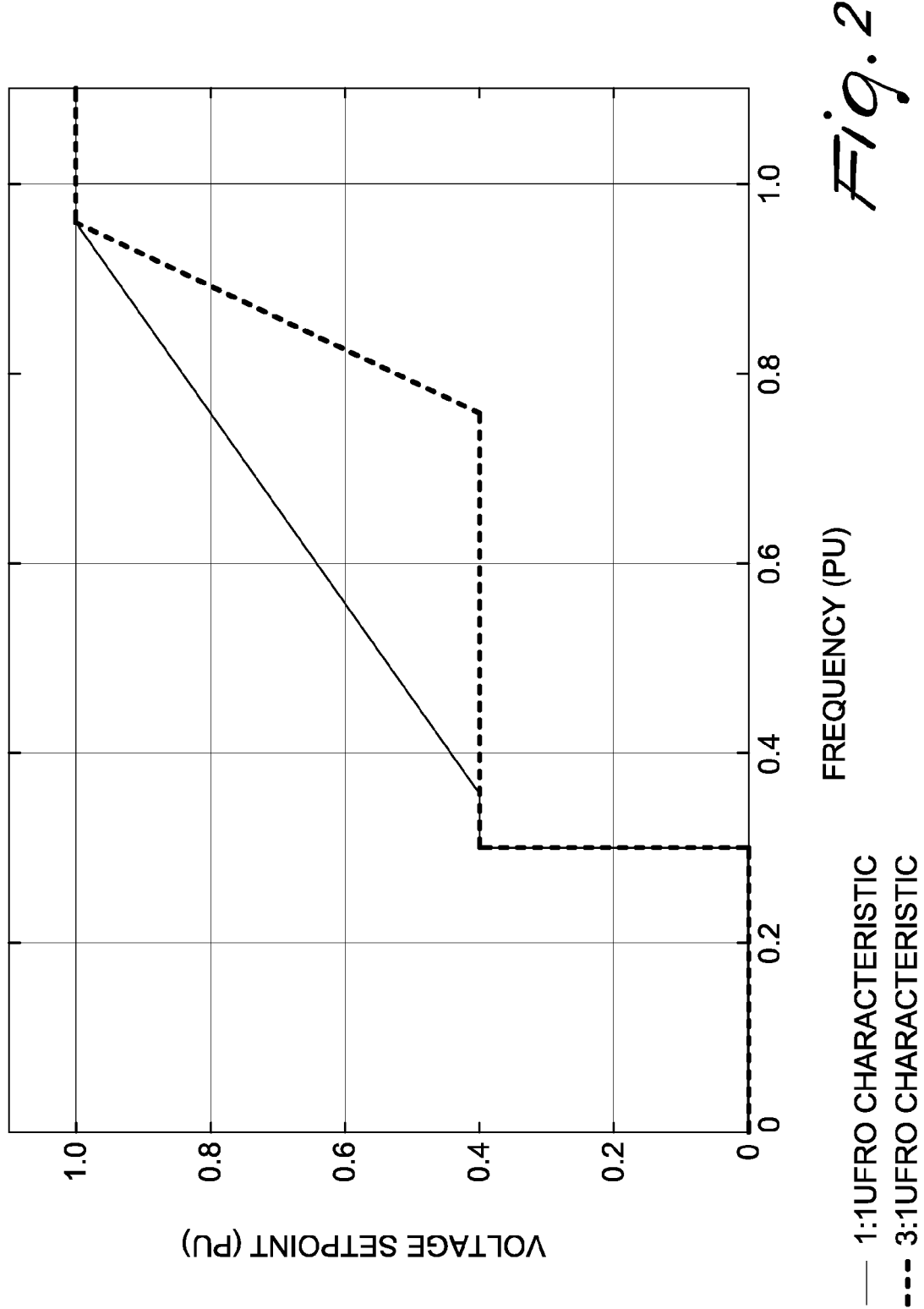
FIG. 2 is a graph showing 1:1 V/Hz and 3:1 V/Hz UFRO characteristics illustrating voltage setpoint vs frequency according to the present disclosure.
Figure 3:
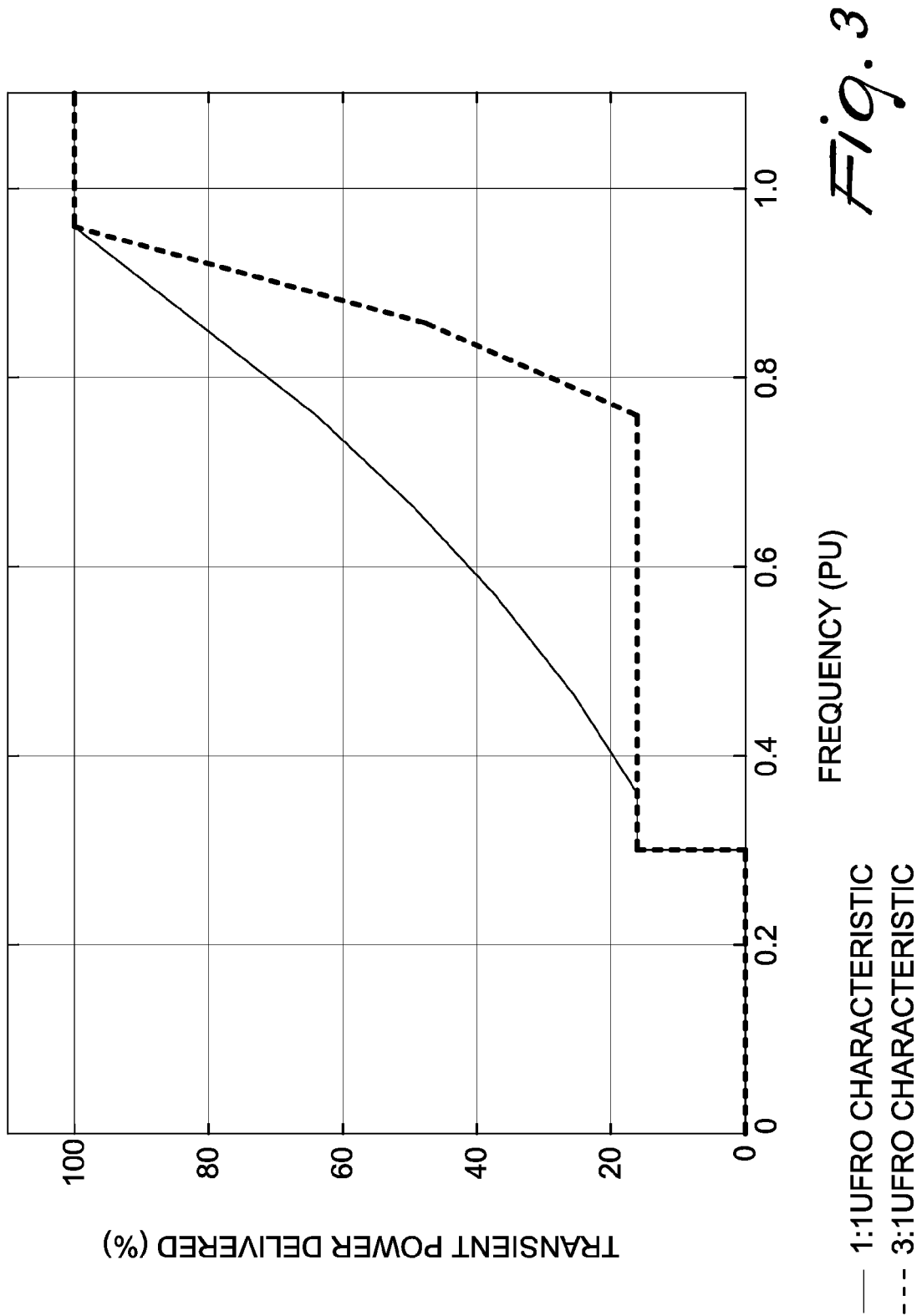
FIG. 3 is a graph showing 1:1 V/Hz and 3:1 V/Hz UFRO characteristics illustrating transient power delivered vs frequency according to the present disclosure.

FIGS. 2 and 3 show the voltage set point and transient power delivered by the first and second characteristics.

A UFRO may be implemented when the frequency drops below a threshold, which may for example be 0.96 pu of the required frequency. For an operating condition, the first UFRO characteristic may be implemented. If the frequency dips below 0.96 pu of its required value, a 15% fall in frequency may effect an 11% reduction in the required voltage. When the engine 12 may be operating under a certain condition, voltage regulator system 10 may ensure that the transient changes in frequency and voltage do not exceed the allowable deviation of 10% and 20% respectively.

The second UFRO characteristic may be used for engines exhibiting poorer load acceptance since the first UFRO characteristic of 1:1 V/Hz may not reduce the required voltage sufficiently to lower the engine load to a level where the frequency remains within the allowable deviation of 10%. The use of the second UFRO characteristic may also avoid the engine stalling. With the second UFRO characteristic of 3:1 V/Hz a required voltage reduction of 33% may occur for a frequency reduction of 15%. The second UFRO characteristic may be suitable for a different operating condition relative to the first UFRO characteristic.

A reduction in the required voltage through implementation of the UFRO characteristics may result in a reduction in load of the engine 12 so that the engine speed may fall less rapidly to avoid stalling of the engine 12.

The voltage regulator system 10 may select a UFRO characteristic on the basis of an operating condition. The voltage regulator system 10 may select a UFRO characteristic on the basis of an operating condition of the genset 5.

Voltage regulator 18 may comprise a Proportional, Integral, Derivative ("PID") controller 32 for maintaining the desired generator 14 voltage output based on the selected UFRO state. The controller 32 may receive terminal voltage and frequency 24 input signals.

The voltage regulator system 10 may vary the magnetic field in the generator 14 through the controller 32. The voltage regulator system 10 may vary the level of excitation 26 through the controller 32.

Controller 32 may vary the magnetic field in the generator 14 or may vary the level of excitation 26 based on an operating condition. Controller 32 may vary the magnetic field in the generator 14 or may vary the level of excitation 26 based on an operating condition of the genset.

The operating conditions may be used by the controller 32 for UFRO selection 36.

The controller 32 may receive an operational signal indicative of an operating condition. In an embodiment, the operational signal may be obtained from a sensor configured for monitoring the operating condition.

In an embodiment, the operating condition may be an engine operating condition 34.

In an embodiment, the operating condition may be a genset operating condition 5.

The performance of engine 12 may vary with operating conditions thereof. The engine operating condition 34 may be used by controller 32 for UFRO selection 36.

Controller 32 may receive an operational signal indicative of an engine operating condition. The operational signal may be obtained from electronic control unit 16. The operational signal may be sent from electronic control unit 16 to controller 32. The operational signal may be sent using a communication protocol. The operational signal may be sent over a controller area network (CAN).

The engine operating condition 34 may be the engine temperature. When the engine temperature is below 70° C. the engine may be in a cold condition. At the cold condition the second UFRO characteristic of 3:1 V/Hz may be selected. When the engine temperature is above 70° C. the engine may be in a hot condition. At the hot condition the first UFRO characteristic 1:1 V/Hz may be selected.

In an embodiment, the operating condition may be the engine coolant temperature. The operating condition may be the coolant temperature. When the coolant temperature is below 70° C. the engine coolant may be in a cold condition and the second UFRO characteristic of 3:1 V/Hz may be selected. When the coolant temperature is above 70° C. the engine coolant may be in a hot condition and the first UFRO characteristic 1:1 V/Hz may be selected.

In another embodiment, the engine operating conditions may be another engine temperature, engine pressure or engine speed.

In another embodiment, the operating condition may be an ambient temperature.

Voltage regulator system 10 may provide a significant improvement to the tolerance of the genset 5 to operate under a cold condition and to reduce the possibility of engine stall without compromising the performance under a hot condition.

Figure 7:
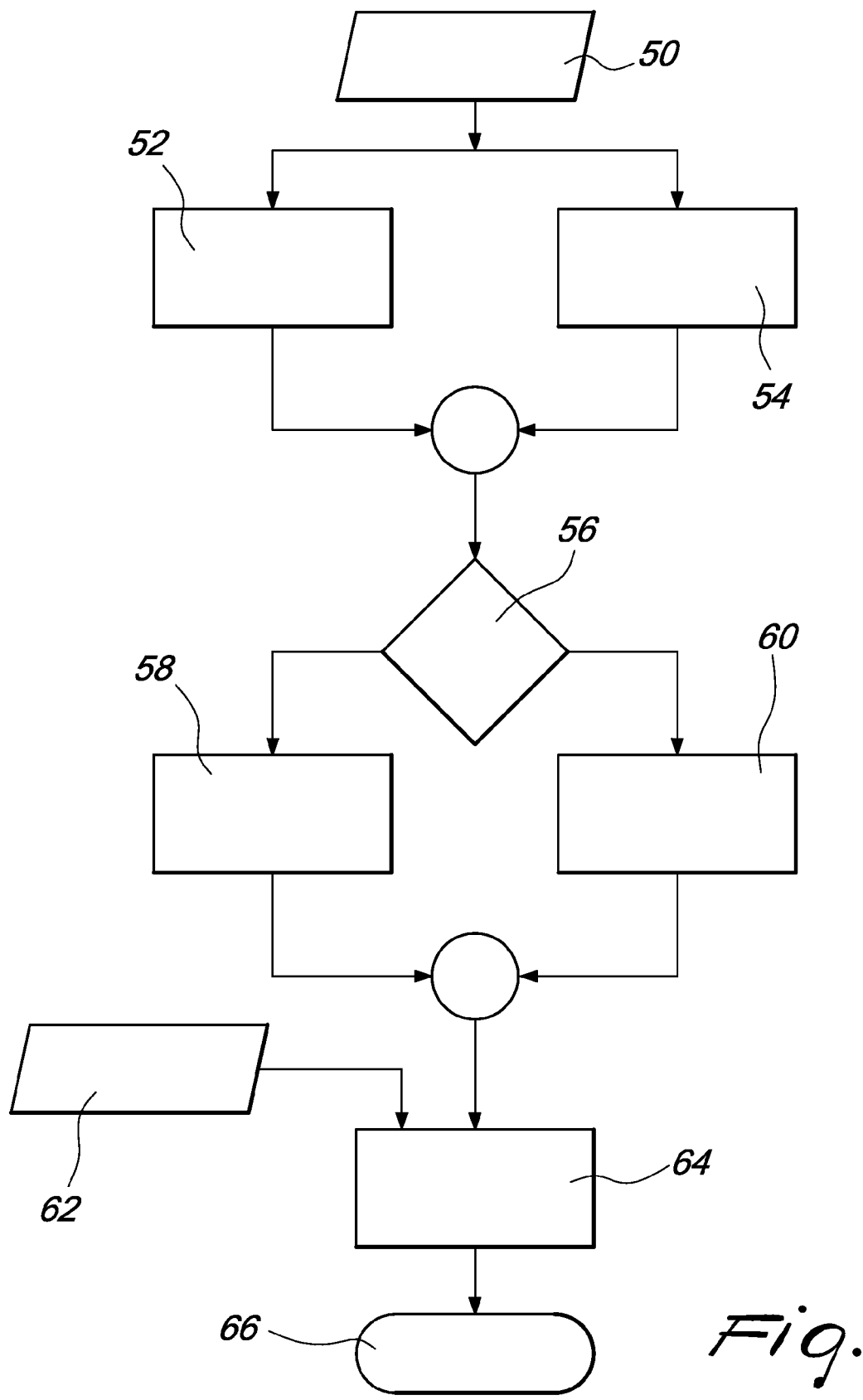
FIG. 7 is a flow chart showing the operation of the voltage regulator system according to the present disclosure.

FIG. 7 illustrates a flow chart for the operation of the voltage regulator system 10. Terminal frequency may be monitored at step 50. Signal indicative of the monitored frequency may be sent to the UFRO state 28 at step 52 and to the UFRO state 30 at step 54.

The UFRO state 28 may provide the first UFRO characteristic of 1:1 V/Hz. The UFRO state 30 may provide the second UFRO characteristic of 3:1 V/Hz. The first UFRO characteristic may be used for setting the voltage set point. Alternatively, the second UFRO characteristic may be used for setting the voltage set point. The selection of the UFRO characteristic may be based on an operating condition.

At step 56 an operating condition may be monitored. In an embodiment, the operating condition may be an engine temperature.

When the engine 12 is considered hot the first UFRO characteristic may be selected at step 58 so that the voltage set point is 1:1 V/Hz. In an embodiment, the engine 12 may be considered hot when the temperature is more than 60° C. In an embodiment, the engine 12 may be considered hot when the temperature is more than 70° C.

When the engine 12 is cold the second UFRO characteristic may be selected at step 60 so that the voltage set point is 3:1 V/Hz. In an embodiment, the engine 12 may be considered cold when the temperature is less than 70° C. In an embodiment, the engine 12 may be considered cold when the temperature is less than 60° C.

Terminal voltage may be monitored at step 62. Signal indicative of the monitored voltage may be sent to the controller 32. The selected voltage set point may be sent as a signal to the controller 32 at step 64.

At step 66 the controller 32 may send a control signal based on the selected voltage set point and the terminal voltage to an excitation control for varying the level of excitation 26.

A method of regulating an output voltage of the genset 5 which comprises the voltage regulator system 10 hereinafter described.

The method may comprise monitoring an operational condition of genset 5. The operational condition may be monitored by a sensor configured to monitor the operational condition. The operational condition may be monitored by the electronic control unit 16. The electronic control unit 16 may monitor the engine speed, engine temperature, engine pressure or engine coolant temperature. The electronic control unit 16 may produce an operational signal indicative of the engine speed, engine temperature, engine pressure or engine coolant temperature.

The method may comprise sending an operational signal indicative of the operational condition to the controller 32 configured to receive the operational signal. The operational signal may be sent over a CAN. The operational signal may be sent by the electronic control unit 16.

The method may comprise selecting a UFRO characteristic from a plurality of UFRO states 28, 30 based on the operational signal. The controller 32 may perform the UFRO selection 36.

The method may comprise implementing the UFRO characteristic for reducing terminal voltage in response to a reduction in terminal frequency.

The skilled person would appreciate that foregoing embodiments may be modified or combined to obtain the voltage regulator system 10 of the present disclosure.

Industrial Applicability

This disclosure describes a voltage regulator system 10 for a genset. The voltage regulator system 10 may effect a switch between different UFRO characteristics depending on the temperature range of the engine of the genset. The voltage regulator system 10 may effect a switch between different UFRO characteristics depending on the temperature range of the engine coolant temperature of the genset. The voltage regulator system 10 may monitor other engine variables for selection of the UFRO.

In an embodiment, a plurality of temperature ranges may be used to select corresponding plurality of UFRO characteristics.

Tests have shown the efficacy of the voltage regulator system 10.

I. Test Facility

The voltage regulator development and testing was conducted on a commercially available 375 kVA (300 kW at 0.8 power factor) genset connected to a resistive load bank, rated up to 340 kW. The genset consists of a modern industrial engine coupled to a three-phase synchronous machine. The synchronous machine is of four-pole construction with brushless excitation. The genset is fitted with a separate permanent magnet generator (PMG). The PMG is fitted to the alternator shaft and is used to derive excitation power. The engine is turbocharged and intercooled, and fitted with a high-pressure fuel injection system.

The test facility is also equipped with The MathWorks xPC system. The xPC system provides a rapid prototyping environment for control system development based on the Matlab and Simulink software tools. The xPC system consists of two standard PCs, a host and a target. The host PC allows the user to create control system models within Simulink. These models are auto-coded into C, and compiled using Real-Time Workshop and Microsoft Visual C. The compiled model is then downloaded from the host PC via Ethernet and is executed on the target PC using a real-time kernel. The target computer contains a National Instruments PCI-6025E data acquisition (DAQ) card and a Softing controller area network (CAN) card. The xPC system is capable of two-way communication between the host and target, facilitating on-line tuning and the ability to display and record responses.

II. Test Criteria

The load acceptance performance of the genset 5 was examined with the use of two tests, derived from ISO8528-5 and NFPA110 (2005). Testing of the genset 5 load acceptance capability was performed both when the engine 12 was hot and following a cold start. The engine was considered hot after the engine had been running for at least 10 min and its coolant temperature had exceeded 70° C. To perform a cold start the genset 5 was shut-down and left overnight to cool to ambient temperature, generally between 10 and 20° C.

The genset 5 was assessed for the ability to accept load while remaining within the limits; a maximum of 20% voltage deviation and 10% frequency deviation (ISO8528-5, G2 limit).

For the genset 5 under investigation, with a standard voltage regulator and at normal operating temperature, the load acceptance capability within the G2 limit was 140 kW or 47% of its standby rating. When cold, this was reduced to 120 kW or 40%.

The second test criterion, derived from NFPA110 (2005), assessed the genset 5 ability to accept 100% of its rated power in a single load acceptance without stalling.

III. 1:1 V/Hz UFRO Characteristic

A 1:1 V/Hz UFRO characteristic is generally considered to provide good performance both for initial load applications (on an unloaded genset) and for intermediate changes in load. Good results were obtained for the two tests, derived from ISO8528-5 and NFPA110.

The genset was able to accept loads up to 140 kW within the ISO8528-5 G2 (20% voltage and 10% frequency) boundaries. The genset was also capable of accepting 300 kW (100% of rated output) with a voltage deviation of 37.2% and a frequency deviation of 40.4%, and recovers without stalling.

The same voltage regulator configuration was tested following a cold start. After 1 min of starting the genset, a 135 kW load was applied. The maximum frequency error was 12.0%—exceeding the 10% limit and hence failing to achieve G2 compliance. The load was purely resistive, and during the transient the power delivered to the load is lower than its rated value. Once the voltage recovered to its nominal value the genset delivered the rated load power.

Figure 4:
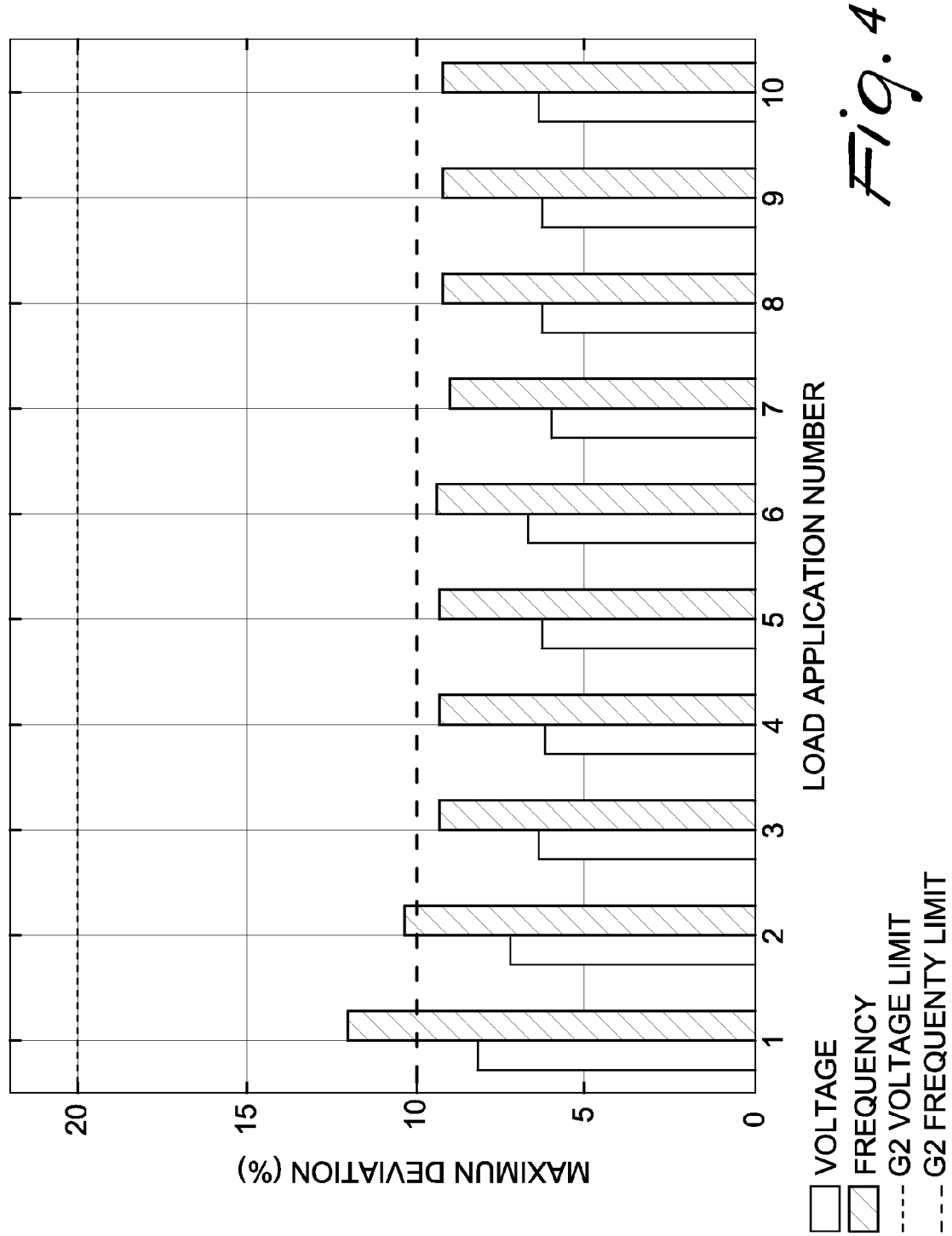
FIG. 4 is a graph showing the maximum voltage and frequency deviations for ten equal magnitude load steps during a warm-up test sequence using a 1:1 V/Hz UFRO characteristic for comparison with the voltage regulator system according to the present disclosure.

FIG. 4 shows the maximum voltage and frequency deviations for each load acceptance within the sequence. Both the first and second load acceptances fail to achieve G2 compliance, but pass from the third onwards.

On a separate cold start, after 1 min of starting the genset, a 300 kW load was applied. The genset failed to recover and consequently was not able to achieve the level of performance required to achieve NFPA110 (2005) certification with the standard voltage regulator configuration.

The 1:1 V/Hz UFRO characteristic results are summarised in Table 1.

TABLE 1

| Genset performance (1:1 V/Hz UFRO characteristic) | | |
| --- | --- | --- |
| Test condition | Hot engine | Cold engine |
| 135 kW ISO8528-5 G2 compliance | Yes | No |
| NFPA110 (2005) accreditation | Pass | Fail |

IV. 3:1 V/Hz UFRO Characteristic

Taking into consideration the reduced performance of the engine when cold, a second configuration was implemented. In order to accept 135 kW when cold, the voltage regulator was configured to provide more voltage relief during load acceptance. This was achieved through the use of a more aggressive 3:1 V/Hz characteristic. The characteristic may provide a much larger voltage reduction than the previous 1:1 V/Hz characteristic to reduce the power delivered to the load during a transient. Although the power delivered to the load during the transient may be lower, the load's rated power will still be delivered with the 3:1 V/Hz characteristic once the genset returns to its rated voltage and frequency.

Figure 5:
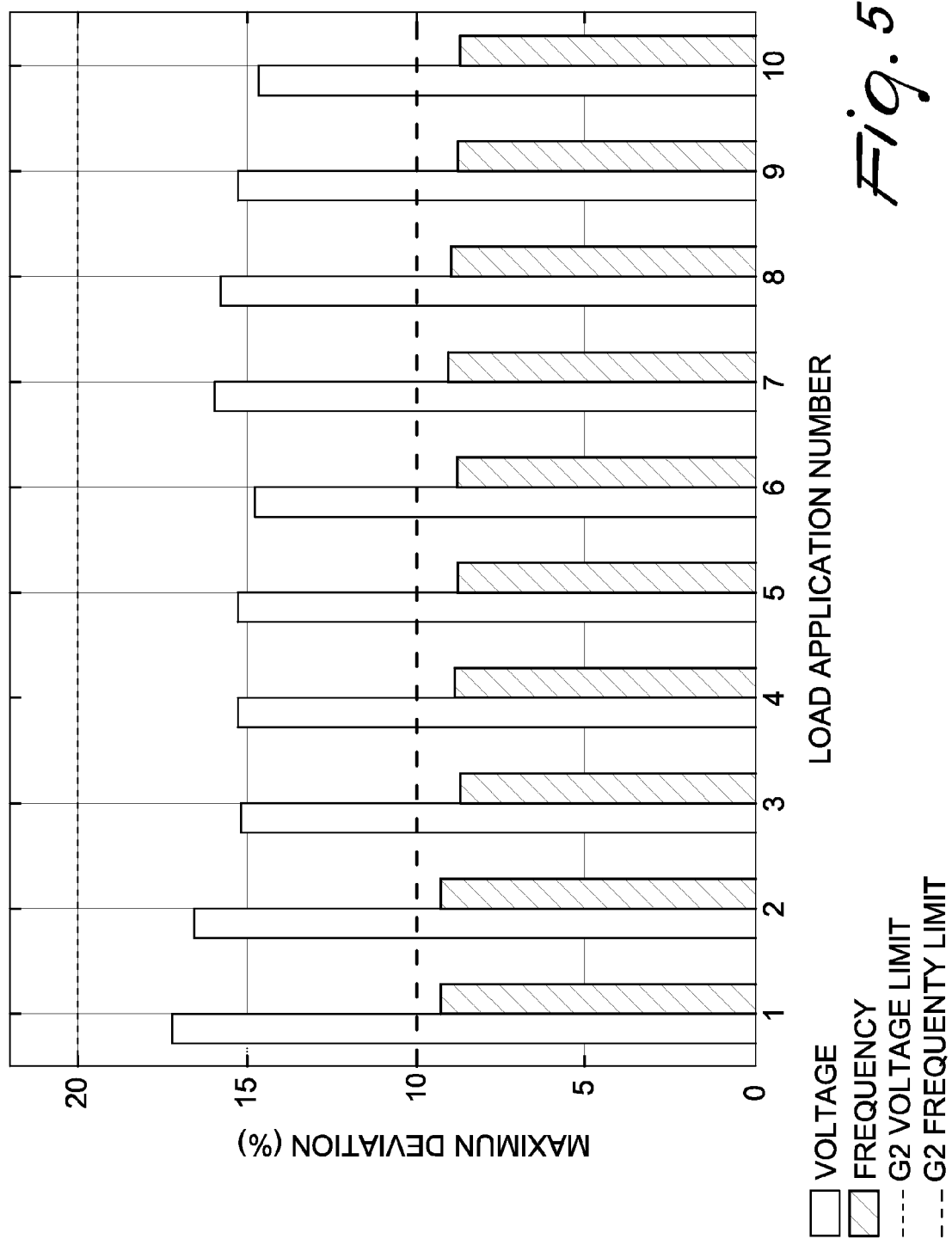
FIG. 5 is a graph showing the maximum voltage and frequency deviations for ten equal magnitude load steps during a warm-up test sequence using a 3:1 V/Hz UFRO characteristics for comparison with the voltage regulator system according to the present disclosure.

The cold configuration was tested against the same test sequence as before. With this configuration, the genset accepted 135 kW within G2 boundaries even when the engine is cold. The results of the 135 kW cold start sequence are shown in FIG. 5.

Implementing a 3:1 V/Hz UFRO characteristic may alter the transient voltage response in order to improve the frequency response. More importantly however, this allows the 'cold' genset to achieve G2 compliance for 135 kW, which was not the case when the 1:1 V/Hz UFRO characteristic was used.

The 3:1 V/Hz UFRO characteristic results are summarised in Table 2.

TABLE 2

| Genset performance (3:1 V/Hz UFRO characteristic) | | |
| --- | --- | --- |
| Test condition | Hot engine | Cold engine |
| 135 kW ISO8528-5 G2 compliance | Yes | Yes |
| NFPA110 (2005) accreditation | Pass | Pass |

The largest drawback of the 3:1 V/Hz UFRO characteristic configuration is that when the engine has reached its full operating temperature the genset may deliver unnecessarily large voltage deviations when subject to an increase in load. On a hot engine, a 1:1 V/Hz UFRO characteristic may be generally considered to provide a good response under a number of different changes in load. With the 3:1 V/Hz UFRO characteristic, the genset performance may be optimised for when the engine is cold but subsequently performs poorly when the engine is hot.

The low quality voltage supply experienced with the 3:1 V/Hz UFRO configuration when the engine is hot is shown in Table 3. Despite the larger transient deviations which are experienced with the 3:1 V/Hz characteristic, the 3:1 V/Hz UFRO characteristic may be required both to achieve ISO 8528-5 G2 compliance for a 135 kW load and to allow the engine to successfully accept 300 kW and to achieve the NFPA110 (2005) requirement.

TABLE 3

Genset transient performance - tests conducted on a hot engine

|  | UFRO 1:1 V/Hz characteristic % Error | UFRO 3:1 V/Hz characteristic % Error |
|---|---|---|
| 135 kW voltage deviation | 9.6 | 14.7 |
| 135 kW frequency deviation | 9.6 | 8.7 |
| 300 kW voltage deviation | 37.2 | 56.1 |
| 300 kW frequency deviation | 40.4 | 20.8 |

V. Voltage Regulator System 10

The voltage regulator system 10 may have two previous configurations: a hot configuration having the 1:1 V/Hz UFRO characteristic and a cold configuration having the 3:1 V/Hz UFRO characteristic. The configurations may be switched depending on the engine coolant temperature. The switching threshold between hot and cold may be set to 70° C.

The temperature based configuration was tested using the cold starting sequence. When the engine 12 was considered cold (<70° C.), the voltage regulator system 10 selected 3:1 V/Hz UFRO characteristic. Following a 135 kW load acceptance, the voltage and frequency remained within the G2 boundaries. Once the engine 12 warmed, the voltage regulator system 10 reduced the amount of voltage relief.

Figure 6:
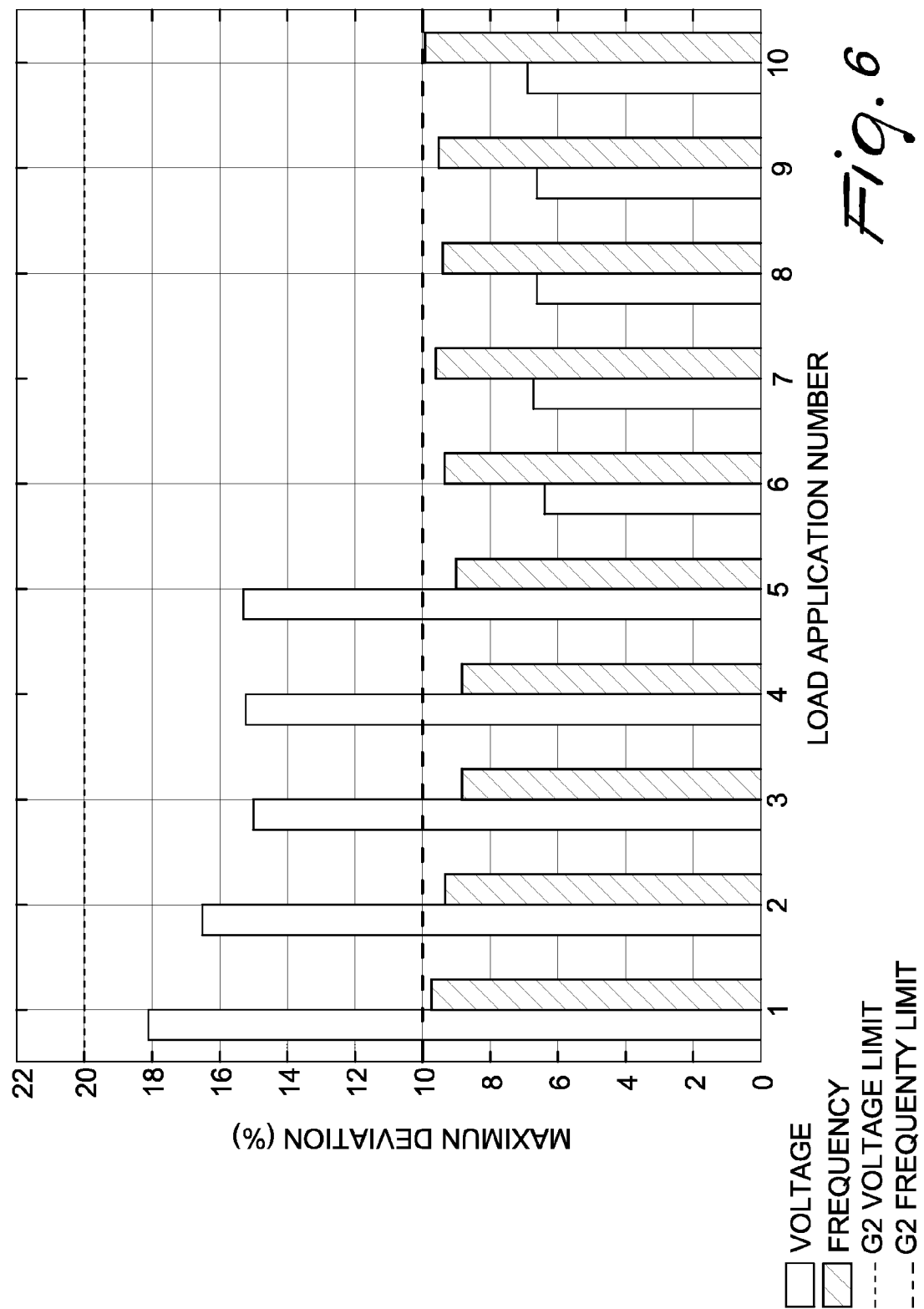
FIG. 6 is a graph showing the maximum voltage and frequency deviations for ten equal magnitude load steps during a warm-up test sequence using the voltage regulator system according to the present disclosure.

When the engine 12 was considered hot (>70° C.), the voltage regulator system 10 selected the 1:1 V/Hz UFRO characteristic. The maximum voltage and frequency deviations for the temperature based configuration, during the cold start sequence are shown in FIG. 6. The performance is summarised in Table 4.

TABLE 4

Performance of voltage regulator (temperature based UFRO configuration)

| Test condition | Hot engine | Cold engine |
|---|---|---|
| 135 kW ISO8528-5 G2 compliance | Yes | Yes |
| NFPA110 (2005) accreditation | Pass | Pass |

Following a cold start, a 300 kW load was applied to the genset 5. The genset 5 was able to recover by using the 3:1 V/Hz UFRO characteristic. Once warmed, voltage regulator system 10 selected the 1:1 V/Hz UFRO characteristic. The transient voltage deviations were significantly reduced. Genset 5 did not stall.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A voltage regulator system for regulating an output voltage of a genset including an engine and a generator, the voltage regulator system comprising:
a voltage regulator comprising a plurality of under-frequency roll-off (UFRO) states, each UFRO state configured to implement a UFRO characteristic for reducing terminal voltage in response to a reduction in terminal frequency, and
a controller configured to receive an operational signal indicative of an operating condition of the genset for selection of a UFRO state based on the operational signal,
wherein a first UFRO state of the plurality of UFRO states is selected when an engine coolant for the engine is in a hot condition and a second UFRO state of the plurality of UFRO states is selected when the engine coolant is in a cold condition.

2. The voltage regulator system of claim 1, wherein the operational signal is received from an electronic control unit.

3. The voltage regulator system of claim 1, wherein the first UFRO state implements a first UFRO characteristic of 1:1 V/Hz and the second UFRO state implements a second UFRO characteristic of 3:1 V/Hz.

4. The voltage regulator system of claim 1, wherein the first UFRO state and the second UFRO state are provided as separate modules.

5. The voltage regulator system of claim 1, wherein the engine coolant is in a hot condition when the engine coolant temperature is more than 70° C. and the engine coolant is in a cold condition when the engine coolant temperature is less than 70° C.

6. A genset comprising:
an engine;
a generator; and
a voltage regulator system for regulating an output voltage of the genset, the voltage regulator system comprising:
a voltage regulator comprising a plurality of under-frequency roll-off (UFRO) states, each UFRO state configured to implement a UFRO characteristic for reducing terminal voltage in response to a reduction in terminal frequency, and
a controller configured to receive an operational signal indicative of an operating condition of the genset for selection of a UFRO state based on the operational signal;
wherein a first UFRO state of the plurality of UFRO states is selected when an engine coolant for the engine is in a hot condition and a second UFRO state of the plurality of UFRO states is selected when the engine coolant is in a cold condition.

7. The genset of claim 6, wherein the first UFRO state implements a first UFRO characteristic of 1:1 V/Hz and the second UFRO state implements a second UFRO characteristic of 3:1 V/Hz.

8. A method for regulating an output voltage of a genset comprising an engine, a generator, and a voltage regulator system, the method comprising:
monitoring an operational condition of the genset;
sending an operational signal indicative of the operational condition to a controller configured to receive the operational signal;
selecting an under-frequency roll-off (UFRO) state from a plurality of UFRO states of the voltage regulator system based on the operational signal, wherein a first UFRO state of the plurality of UFRO states is selected when an engine coolant for the engine is in a hot condition and a second UFRO state of the plurality of UFRO states is selected when the engine coolant is in a cold condition, each UFRO state being configured to implement a UFRO characteristic; and
implementing the UFRO characteristic for reducing terminal voltage in response to a reduction in terminal frequency.

9. The method of claim 8 wherein the first UFRO state implements a first UFRO characteristic of 1:1 V/Hz and the second UFRO state implements a second UFRO characteristic of 3:1 V/Hz.

\* \* \* \* \*